United States Patent
Kim et al.

(10) Patent No.: US 8,655,074 B2
(45) Date of Patent: Feb. 18, 2014

(54) DOCUMENT EDITING APPARATUS AND METHOD

(75) Inventors: Ji-Hoon Kim, Seoul (KR); Sang-Ho Kim, Gyeonggi-do (KR); Seong-Taek Hwang, Gyeonggi-do (KR); Dong-Chang Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 274 days.

(21) Appl. No.: 13/019,720

(22) Filed: Feb. 2, 2011

(65) Prior Publication Data

US 2011/0194770 A1    Aug. 11, 2011

(30) Foreign Application Priority Data

Feb. 5, 2010    (KR) .................. 10-2010-0011063

(51) Int. Cl.
*G06K 9/00*    (2006.01)
*G06K 9/34*    (2006.01)

(52) U.S. Cl.
USPC .......................................... 382/176; 382/181

(58) Field of Classification Search
USPC ................................................ 382/181–231
See application file for complete search history.

(56) References Cited

U.S. PATENT DOCUMENTS

| | | | | |
|---|---|---|---|---|
| 5,553,162 | A | * | 9/1996 | Gaborski et al. ............. 382/192 |
| 5,893,127 | A | * | 4/1999 | Tyan et al. .................... 715/209 |
| 6,057,844 | A | * | 5/2000 | Strauss ......................... 715/863 |
| 6,288,799 | B1 | | 9/2001 | Sekiguchi |
| 6,341,176 | B1 | * | 1/2002 | Shirasaki et al. ............ 382/229 |
| 6,470,336 | B1 | * | 10/2002 | Matsukawa et al. ......... 382/190 |

FOREIGN PATENT DOCUMENTS

JP    9-163064    6/1997

* cited by examiner

*Primary Examiner* — Alex Liew
(74) *Attorney, Agent, or Firm* — The Farrell Law Firm, P.C.

(57) ABSTRACT

A method for storing a document recognition result is proposed. The method includes selecting a picture area from a document image, storing an image of the selected picture area in an image file format, removing the selected picture area, filling the removed picture area with a surrounding background color, and performing character recognition of a text area.

16 Claims, 8 Drawing Sheets

ORIGINAL IMAGE

IMAGE FROM WHICH PICTURE AREA IS REMOVED

ORIGINAL IMAGE

WEB DOCUMENT

IMAGE KEYWORD SELECTION

IMAGE SEARCH RESULT

DOCUMENT EDITING APPARATUS AND METHOD

PRIORITY

This application claims priority under 35 U.S.C. §119(a) to an application entitled "Document Editing Apparatus and Method" filed in the Korean Intellectual Property Office on Feb. 5, 2010 and assigned Serial No. 10-2010-0011063, the contents of which are incorporated herein by reference.

BACKGROUND OF THE INVENTION

1. Field of the Invention

The present invention relates generally to a document editing apparatus and method, and more particularly, to a document editing apparatus and method for recognizing a printed document and storing the printed document in a similar way to a configuration of the printed document.

2. Description of the Related Art

An image character recognition device using a camera performs recognition by capturing an image of a printed document. In this case, a user may want to store the entire document including text rather than recognized text itself. According to this request, a captured document image is recognized by using various character recognition algorithms and converted to text data, thereby storing a document recognition result. The text data generated by the document recognition is processed in the form of a document file preset by the user and stored in a memory. The document file is stored in the form of a text file.

In general, a document is divided into more than one area, and characters included in a corresponding area of the divided areas are first processed. Accordingly, a sequence of character strings may be changed according to a configuration or a multi-paragraph type of a document image, and sentences of different paragraphs may be mixed. These changes may be significant enough to prevent understanding of the document based on the recognized text. Thus, when a recognition result is stored, recognition and storing of text and character strings of the entire document, instead a small number of characters, are a key consideration. Therefore, it is important to store the meaning of paragraphs without distortion.

Recently, the development of image processing technology and character recognition technology has significantly increased the possibility of character recognition on a somewhat deteriorated image. However, when a document divided into a picture area and a text area is recognized and stored, characters included in the same area are preferentially stored through an area analysis corresponding to a recognition preprocessing process. Conventionally, since only text data is simply stored after recognizing a text area, capabilities for storing various media documents through recognition is decreased. Thus, when a picture area, such as a picture, a graph, and/or a table, is included in a document which a user desires to store, the picture area may be misrecognized, thereby storing misrecognized characters.

SUMMARY OF THE INVENTION

As described above, when recognition of a document divided into areas is performed, if an area analysis is not properly performed, in many cases, a sequence of recognized characters is disrupted, thereby decreasing an ability to convey the meaning of the recognized characters, to the point that the recognized characters may be useless even after storing them. Moreover, when a picture area is included in a document, the picture area is limited to storing a table, graphic characters, and/or a picture due to misrecognition of the picture area.

An aspect of the present invention substantially solves at least the above problems and/or disadvantages and to provide at least the advantages below. Accordingly, an aspect the present invention provides a document editing apparatus and method for allowing a user to easily read and understand a document by storing a document image in a state of maintaining a layout of the document image as it is.

According to one aspect of the present invention, a document editing apparatus is provided. The document editing apparatus includes an image processor for determining whether a picture area is included in a document image, and if the picture area is included in the document image, selecting the picture area; a picture area storage unit for capturing the selected picture area and storing the captured picture area as an image file; a character recognizer for performing character recognition of a text area remaining by removing the selected picture area from the document image and outputting text data and position information of the text data as a result of the character recognition; a recognition result converter for determining a structure of the text area and converting the position information of the text data so as to correspond to the determined structure; and a web document creator for editing a web document by synthesizing the converted position information of the text data, the text data, the image file, and web document code.

According to another aspect of the present invention, a document editing method is provided. The document editing method includes determining whether at least one picture area is included in a document image; if at least one picture area is included in the document image, selecting the picture area; capturing the picture area and storing the captured picture area as an image file; performing character recognition of a text area remaining by removing the picture area from the document image; outputting text data and position information of the text data as a result of the character recognition; perceiving a structure of the text area and converting the position information of the text data so as to correspond to the perceived structure; and editing a web document by synthesizing the converted position information of the text data, the text data, the image file, and web document code.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE EMBODIMENTS OF THE PRESENT INVENTION

Embodiments of the present invention are described herein below with reference to the accompanying drawings. In the following description, although many specific items, such as components of a concrete circuit, are shown, they are only provided to help general understanding of the present invention, and it will be understood by those of ordinary skill in the art that the present invention can be implemented without these specific items. In the following description, well-known functions or constructions are not described in detail since they would obscure the invention with unnecessary detail.

Embodiments of the present invention provide a method for storing a document recognition result. In order to store the result, embodiments of the present invention select a picture area from a document image, store an image of the picture area in an image file format, remove the picture area, fill the picture area with a surrounding background color, and perform character recognition of a text area. At this time, a recognition result includes position information of each line, each word, and each character. Then, a web document composed of entities capable of disposing text data in correspondence with the position information is created. Through the above-described process, a user can see a document recognition result in which a layout of the document image is maintained.

Components and operations of a document editing apparatus in which the above-described functions are implemented are described as follows with reference to FIG. 1.

Figure 1:
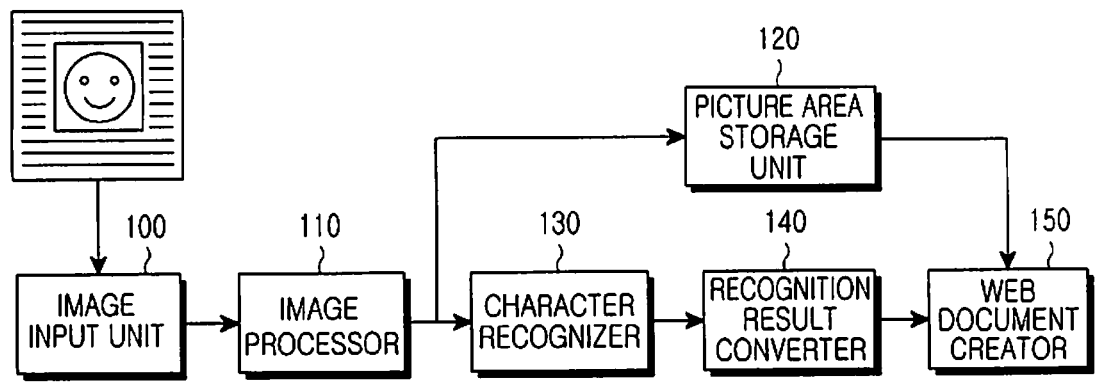
FIG. 1 is a block diagram illustrating a document editing apparatus according to an embodiment of the present invention.

Referring to FIG. 1, a document editing apparatus according to an embodiment of the present invention includes an image input unit 100, an image processor 110, a picture area storage unit 120, a character recognizer 130, a recognition result converter 140, a web document creator 150.

The image input unit 100 receives a document image. The image input unit 100 may be a camera, for example.

The image processor 110 converts the document image input through the image input unit 100 to image data. The image data may be stored in a memory. If a user performs a character recognition function, the image processor 110 determines whether the image data, i.e., the document image, includes a picture area, and selects the picture area.

At this time, the selection of the picture area is performed through one of automatic, semiautomatic, and manual selection methods. In the case of the automatic selection method, the image processor 110 performs an area analysis on the document image in advance by using a picture area extraction algorithm and directly selects a picture area based on an analysis result without a selection of the user. With automatic selection, the document image may include a picture as well as a graph, graphic characters, and/or a table. Accordingly, there may be one or more selected picture areas.

For the semiautomatic selection method, the image processor 110 detects at least one picture area included in the document image first, and then marks the detected at least one picture area, in order to indicate the at least one picture area to the user. The image processor 110 requests a user selection from the marked at least one picture area. Accordingly, the user can select or modify a desired picture area. For example, if a plurality of picture areas is detected, the image processor 110 may change a color of borders of a corresponding picture area or shade the corresponding picture area through a marker. Then, the user can select all or a portion of the plurality of picture areas. The user may also select only a part of the selected picture area to be captured by adjusting a size of the selected picture area.

Figure 3:
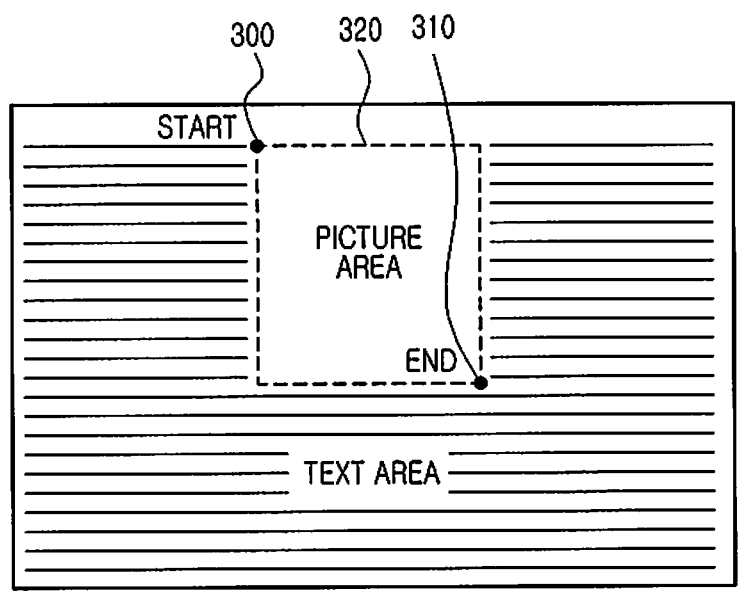
FIG. 3 is a diagram illustrating a method of designating a picture area in a document according to an embodiment of the present invention.

The manual selection method is a method for enabling the user to directly select a picture area by designating the picture area through a touching or dragging scheme. With reference to FIG. 3 for the designation of a picture area, the user can change a size of a picture area 320 by dragging borders of the picture area 320 or touching a starting point 300 and an ending point 310.

If the picture area is selected through one of the above-described methods, the image processor 110 captures the selected picture area and stores the captured picture in the picture area storage unit 120 in an image file format such as JPG (Joint Photographic (Experts) Group). After the captured image is stored, identification information is allocated according to a sequence of the selected picture area in order to easily enable web document code insertion.

Upon completion of the selection and storing of the picture area, the character recognizer 130 performs character recognition for the document and stores a result of the character recognition according to a predetermined structure. At this time, if the character recognition is performed in a state where the picture area is included in the document image, the picture area may be misrecognized, and thus a recognition result in which misrecognized characters are included may occur. Accordingly, according to embodiments of the present invention, in order to prevent the occurrence of misrecognition, a picture area is removed from a document image, filled with a surrounding background color, and included in a text area. Here, although the picture area can be filled with a surrounding background color, alternatively, the picture area may be filled with a single color obtained by calculating a mean value of pixel values in the surroundings of the picture area or filled through the gradation of color, such that there is no boundary between the picture area and its surroundings.

Figure 4A:
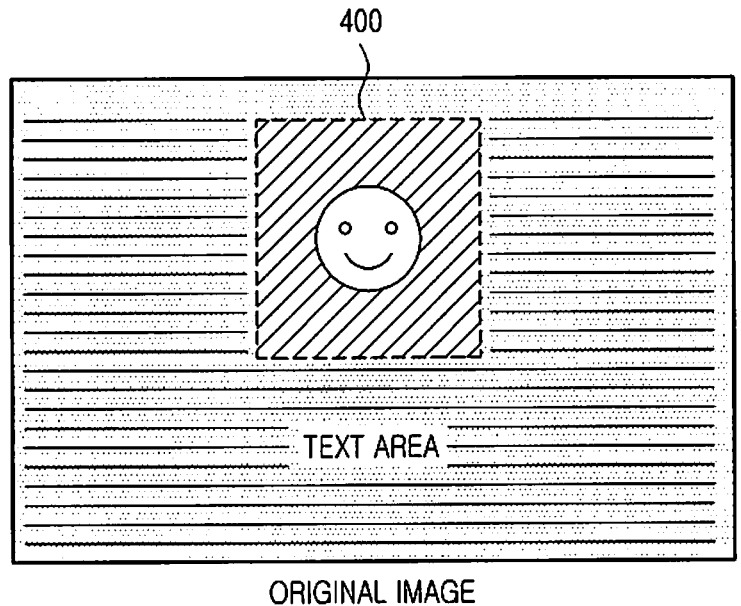
FIGS. 4A and 4B are diagrams illustrating a method of recognizing a text area in a document according to an embodiment of the present invention.
Figure 4B:
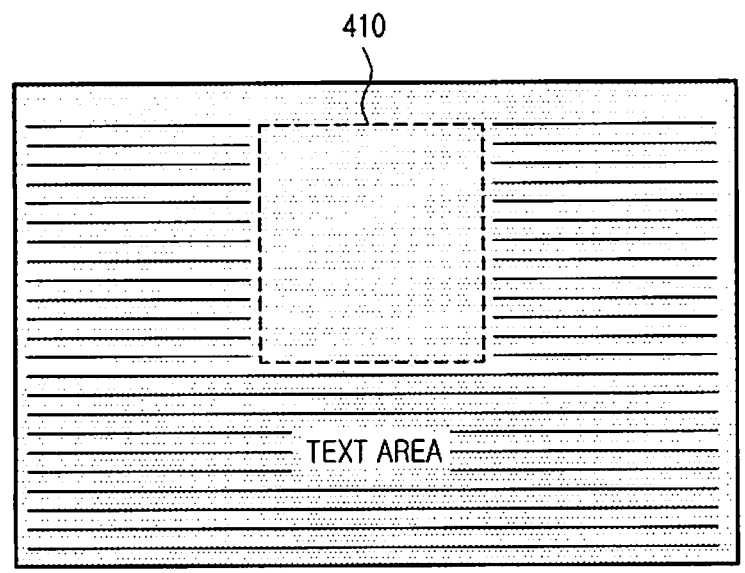

FIG. 4A illustrates a document image including a picture area 400. If the picture area 400 shown in FIG. 4A is removed, the picture area 400 is filled with a surrounding background color so that the removed area itself is not misrecognized as characters. FIG. 4B illustrates a picture area 410 filled with a background color of a text area or a background color adjacent to the previous picture area 400. In this case, the picture area is filled with a surrounding background color to be considered as a blank area in which text does not exist.

Accordingly, since the character recognizer 130 does not perform recognition with respect picture components of the originally captured image, occurrences of false positives can be prevented, thereby increasing a character recognition ratio and significantly reducing a recognition time. Herein, a false positive refers to a case where a non-text image portion is erroneously recognized as text.

The character recognizer 130 performs character recognition of a text area. The character recognizer 130 denotes a recognition engine and outputs text data largely recognized through the character recognition and position information of the text data. Here, special characters and symbols included in the document image are filtered according to a recognition purpose. However, in the character recognition according to embodiments of the present invention, since various symbols and others included in a document image must also be recognized and shown, the document image including special characters and symbols is output as a recognition result without filtering.

The most text data according to the recognition result are formed with a line-word-character structure. A sequence of the structure can be variously changed according to how a text area was analyzed when a recognition result was stored. For example, phrases separated to multiple paragraphs may be continued as one sentence, and a sentence to come next may come first. If such a result is stored as it is, it is difficult for a user to read a sentence, and thus the user cannot correctly perceive the contents of a document.

Thus, the recognition result converter 140 for gathering characters separated according to a corresponding structure to edit a single sentence or paragraph is required. The recognition result converter 140 determines a structure of the text area from the document image and converts the position information of the text data in correspondence with the perceived structure. In order to determine the structure, the recognition result converter 140 uses the position information of the text data, e.g., each of lines, words, and characters, provided by the character recognizer 130. In this example, the position information refers to rect information regarding each of lines, words, and characters. In the data structure composed of lines, words, and characters, word data is composed of corresponding character data, and line data is composed of corresponding word data. Rect information is information regarding a rectangular region. Accordingly, in order to edit a single line character string, corresponding character data must be gathered into a buffer according to line data information. Line buffer data in which corresponding characters are gathered is synthesized with web document code.

As explained above, the recognition result converter 140 gathers character data per line of the text area and converts position information from a structure of the recognition result formed with line-word-character to a structure of the character data gathered in correspondence with each line. The recognition result converter 140 delivers the converted position information of the recognition result and the text data to the web document creator 150.

The web document creator 150 creates a web document by creating web document code according to the converted position information of the recognition result, the text data, and the image file and synthesizing the web document code with the converted position information of the recognition result, the text data, and the image file. According to embodiments of the present invention, a web document format is used to store and show a recognition result as a document image is by using position information. In particular, an example of using HyperText Markup Language (HTML) is described herein as a representative example of the web document format according to an embodiment of the present invention.

The web document creator 150 edits a structured document in which lines, words, and characters of data in the text area is disposed at respective positions with HTML. A method of editing a document image with HTML in the web document creator 150 is described as follows.

TABLE 1

```
<HTML>
<HEAD>
<BODY>
<IMG SRC = "IMAGE.JPG">
</BODY>
<BODY>
<FONT-SIZE="FONT-SIZEpt">TEXT</FONT>
```

TABLE 1-continued

```
<P>TEXT</P>
<BR>
<TABLE BORDER="TABLE THICKNESS" WIDTH="TABLE HORIZONTAL LENGTH" HEIGHT="TABLE VERTICAL LENGTH">
<TR>
<TD>TEXT</TD>
</TR>
</TABLE>
</BODY>
</HTML>
```

The structured document shown in Table 1 basically includes a head part <HEAD>, and an image file link is inserted between <BODY> and </BODY>. A sequence of the image file link is defined according to a predetermined naming method. An entity for displaying characters at specific positions follows next in the structured document. The entity can be a table or layer. Before a position, width, and height of the entity is input, it is necessary to readjust a font size and a character size for a screen display, because position information of a recognition result is proportional to a resolution of an actually captured document image. That is, a rect size of the recognition result set to the resolution of the actually captured document image must be readjusted in order for the document image to be easily viewed through a web browser at a glance. A detailed description of the readjustment is described further herein below.

Figure 6:
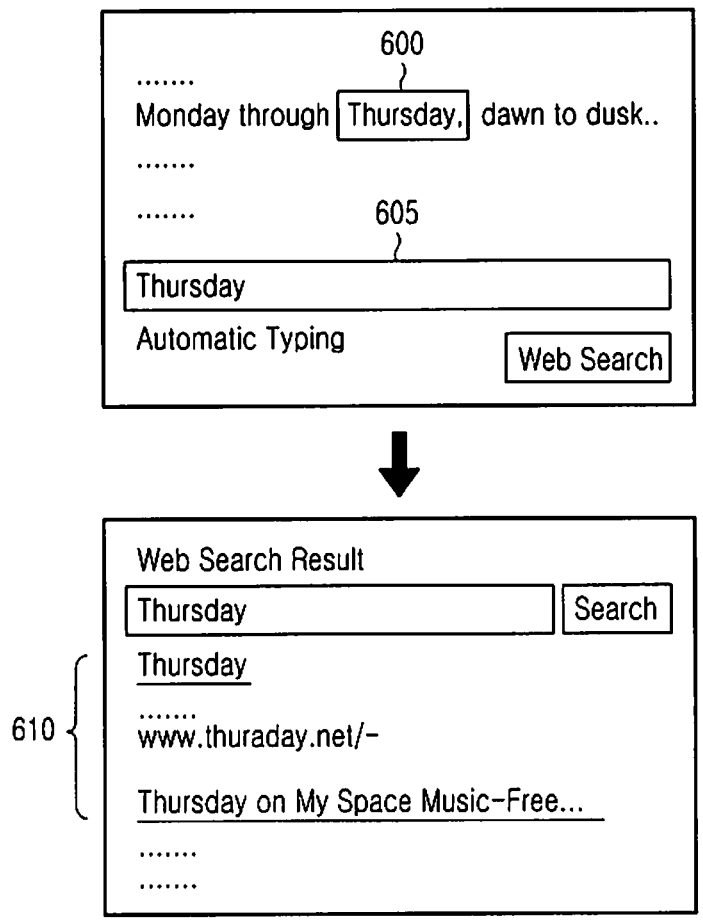
FIGS. 6 and 7 are diagrams illustrating application examples of a recognition result according to an embodiment of the present invention.
Figure 7A:
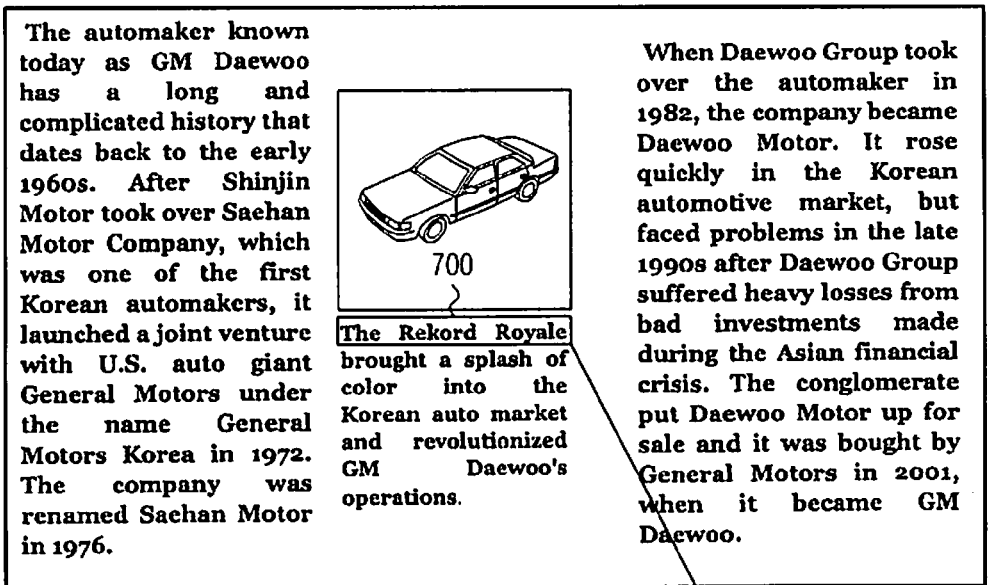
Figure 7B:
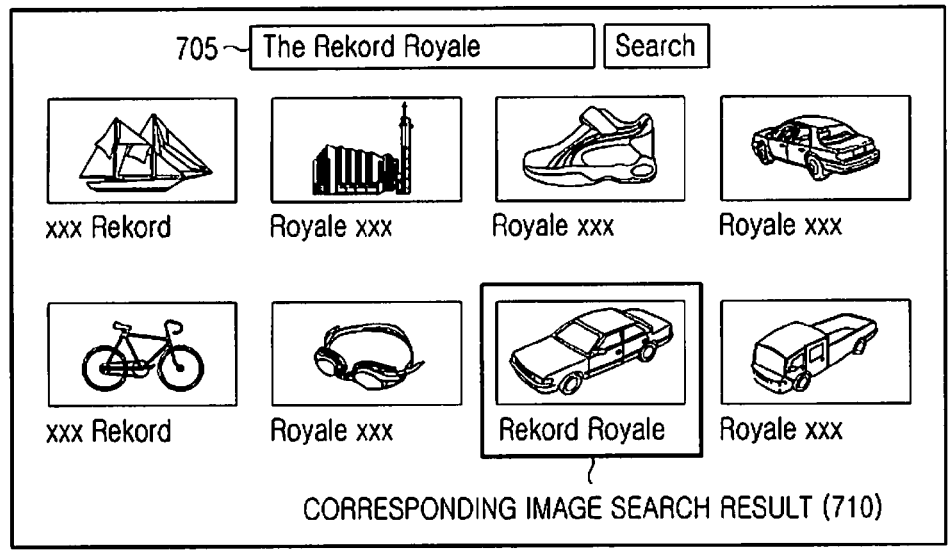

The web document creator 150 inserts the recognized text data into the entity set to the readjusted position and size. Here, the web document creator 150 may insert a link object associated with the text data. The link object may be any of an e-mail, a Uniform Resource Locator (URL), a telephone number, etc. associated with the text data. A user-convenient and friendly document storage function using various tags or Javascript supported in HTML may also be added. FIG. 6 illustrates a case where, when text data 600 is selected in a method such as dragging or clicking, the text data 600 is automatically set in a search window 605, and a web search result list 610 associated with the text data 600 is displayed. As shown in FIG. 6, since a search proceeds only if a search button is pressed in a state where corresponding text data is automatically displayed in the search window 605, a web search result can be shown even without a separate keyword input, thereby increasing user's convenience. In addition, when a search for an image stored as a web document is performed through a web as shown in FIG. 7A, the description 700 is input into a search window 705 as shown in FIG. 7B only if a description 700 of the image is dragged, thereby easily showing a web image search result 710.

According to the above-described structured document editing method, a layout of an existing document image can be easily edited with HTML. As described above, since a recognition result in which characters and pictures are disposed at respective positions as in an original document image can be shown by using position information of text data, the readability of the structured document may increase.

Operations of a document editing apparatus according to an embodiment of the present invention is described as follows with reference to FIG. 2.

Figure 2:
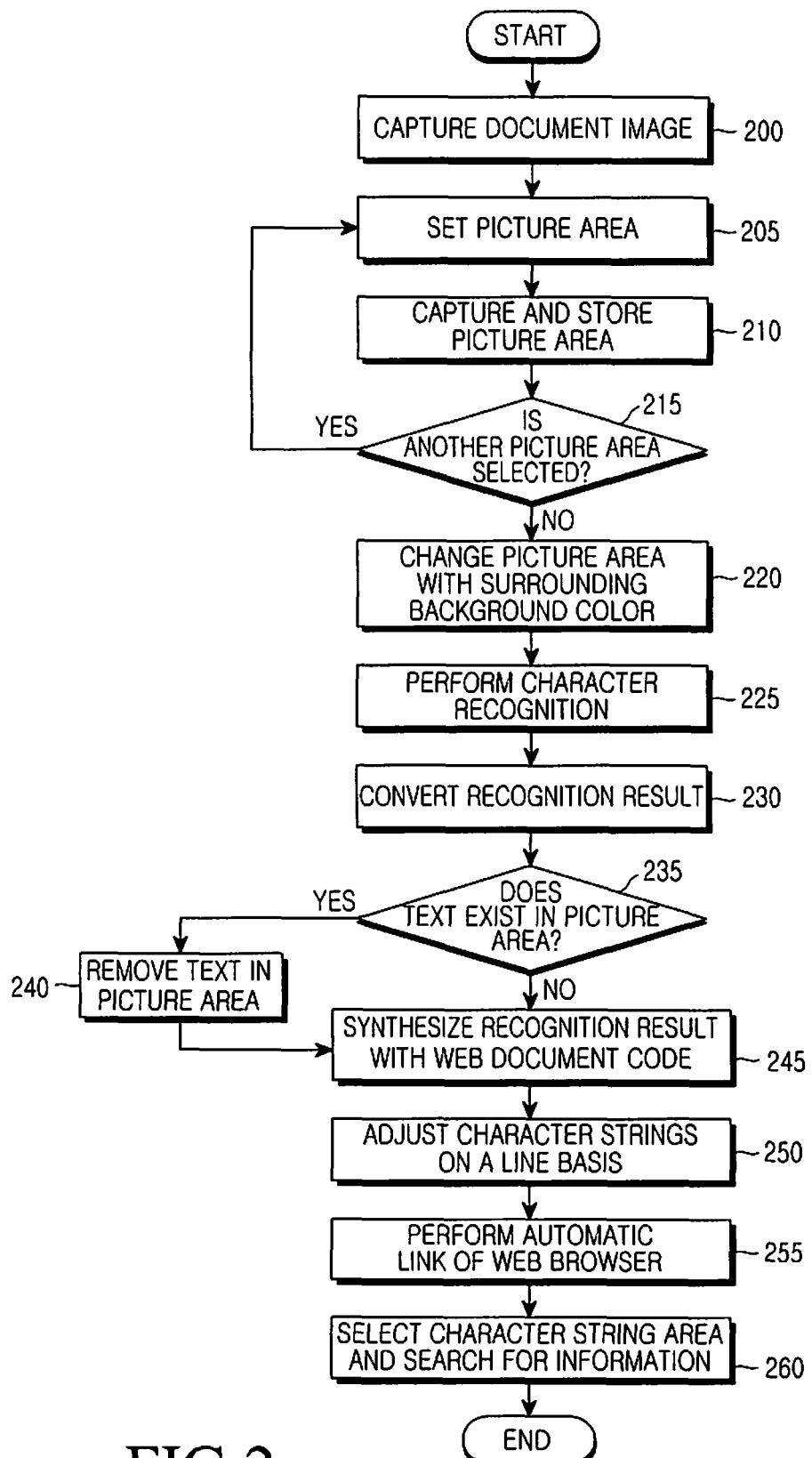
FIG. 2 is a flowchart illustrating an operation of the document editing apparatus, according to an embodiment of the present invention.

Referring to FIG. 2, when a document image is captured by a user in step 200, the document editing apparatus sets a picture area in the captured document image, in step 205. The setup of the picture area is achieved by one of the automatic, semiautomatic, and manual selection methods as described above. In step 210, the document editing apparatus captures the set picture area and stores the captured picture area as an image file. In step 215, the document editing apparatus determines whether an input for selecting another picture area is received. Upon a determination that an input for selecting another picture area is received, the document editing apparatus proceeds back to step 205 to repeat the above-described procedures. By repeating these steps 205 through 215, if a plurality of picture areas exists in the document image, the plurality of picture areas can be selected.

Thereafter, the document editing apparatus removes the selected picture area, fills the removed picture area with a surrounding background color in step 220, and performs character recognition in step 225. In step 230, the document editing apparatus performs a recognition result conversion for editing a single sentence or paragraph from a recognition result composed of lines, words, and characters according to a predetermined structure.

In step 235, the document editing apparatus determines whether text exists in the picture area. Since character recognition is performed in a state where the picture area has been removed and filled with a background color, the picture area must remain as a blank area even after the character recognition is completed. However, unnecessary text may exist in the picture area as a misrecognized result after the character recognition of the picture area. Thus, before a web document is edited based on the recognition result, post-processing of the picture area is necessary. Accordingly, if recognized text exists in the picture area, the recognized text is due to misrecognition. Therefore, the document editing apparatus removes the recognized text in the picture area in step 240.

Figure 5A:
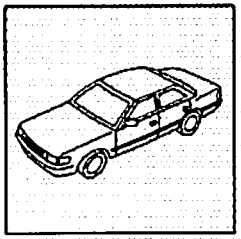
FIG. 5 is a diagram illustrating a comparison between an original document image and a recognition result according to an embodiment of the present invention.
Figure 5B:
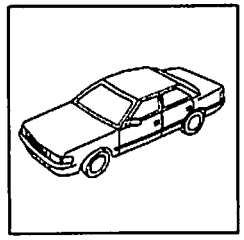

Accordingly, text data and converted position information of the text data are output as a converted recognition result. The document editing apparatus edits an HTML document by synthesizing the recognition result with web document code in step 245. The original document image is illustrated in FIG. 5A, and the HTML document is illustrated in FIG. 5B. Here, since the present invention aims at increasing readability of a user by disposing the recognized text data at corresponding positions as it is, position correction is additionally performed. Accordingly, the document editing apparatus adjusts character strings on a line-by-line basis in step 250.

Figures 8, 9:
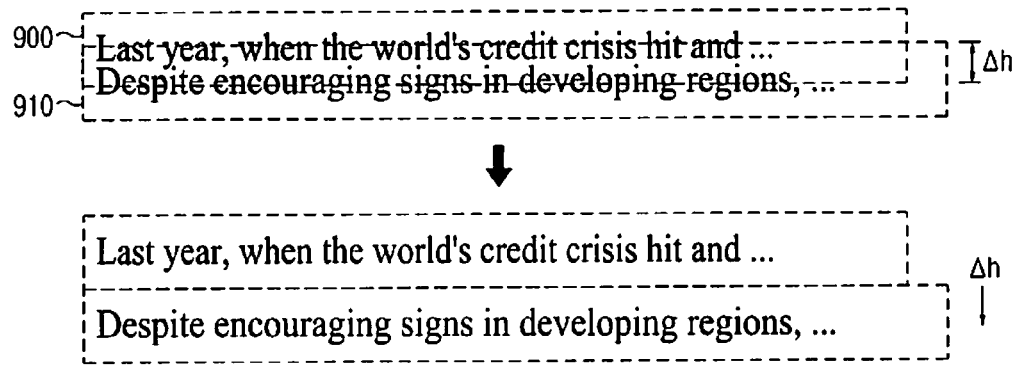
FIGS. 8 and 9 are diagrams illustrating examples of position correction according to an embodiment of the present invention.

The position correction, such as readjusting character strings on a line basis, will now be described with reference to FIGS. 8 and 9. FIG. 8 illustrates a recognition result according to character recognition. As shown in FIG. 8, by comparing rectangular regions surrounding respective characters with each other for comparison between the characters, it can be seen that positions, heights, and widths, in particular heights, of the respectively recognized characters are different from each other. Thus, if a font size is simply set according to a height of each individual character, a document may be difficult to be read due to an uneven display of characters. Accordingly, if an average of heights of multiple characters included in a single line character string is applied to determine a single font size, the single-determined font size may be displayed for the line character string.

Accordingly, the present invention readjusts heights of characters by using a mean font size calculated before a position, WIDTH, and HEIGHT are input when web document code is created. Since characters of which a height of the recognition result is out of a predetermined range have the high probability of noise, the characters are removed so as to not be included in a web document.

As described above, if a method of displaying a recognition result in a web document by binding the recognition result on a single line basis is selected, an upper line 900 and a lower line 910 may overlap as shown in FIG. 9. This is a phenomenon generated by wrongly analyzing position information of character strings and outputting the character strings in the character recognizer 130, and since two character strings are shown as overlapping in a web document, readability of the web document significantly decreases. Thus, the document editing apparatus determines, for each pair of consecutive lines whether the lines in the pair overlap each other. Upon a determination that overlapping lines exist, a lower line of the pair of lines is moved downwards by an overlapping part $\Delta h$. In detail, upon a determination that a bottom coordinate of an upper line rect is greater than a top coordinate of a lower line rect as shown in FIG. 9, the document editing apparatus determines that the two lines overlap each other and moves the lower line rect downwards by the overlapping part.

After adjusting the character strings on a line basis, the document editing apparatus stores a finally created web document and performs automatic web browser link in step 255. The stored web document is displayed through the web browser.

If a character string area is selected and a search request is input by a user, information associated with the selected character string area is displayed through the web browser in step 260.

When a document based on a web document according to embodiments of the present invention is stored, a picture, a table, and a graph included in the document can be stored together, and a readability of the document can increase by showing an unmodified layout of a captured document. Moreover, according to embodiments of the present invention, since a stored document can be shown through a web browser without a separate user interface program by using various types of tags or Javascripts supported in a web document, various functions of the web browser can also be provided. Accordingly, users already familiar with a web browser through Internet can more easily utilize a document recognition result.

Embodiments of the present invention may be implemented in the form of hardware, software, and/or a combination thereof. Any such software may be stored, for example, in a volatile or non-volatile storage device such as a Read Only Memory (ROM) device, a memory such as Random Access Memory (RAM), a memory chip, a memory device, or a memory Integrated Circuit (IC), or a recordable optical or magnetic medium such as a Compact Disc (CD), a Digital Versatile Disc (DVD), a magnetic disk, or a magnetic tape, regardless of erasability or re-recordability of the medium. The storage device and the storage medium may be embodiments of machine-readable devices suitable for storing a program including instructions that are executed by a processor device to thereby implement embodiments of the present invention. Therefore, embodiments of the present invention may include a program including codes for implementing a system or method claimed in any claim of the accompanying claims and a machine-readable device for storing such a program. Further, such a program may be electronically conveyed through any medium such as a communication signal transferred via a wired or wireless connection and embodiments of the present invention may further include equivalents thereto.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A document editing apparatus comprising:
an image processor for determining whether a picture area is included in a document image, and if the picture area is included in the document image, selecting the picture area;
a picture area storage unit for capturing the selected picture area and storing the captured picture area as an image file;
a character recognizer for performing character recognition of a text area remaining by removing the selected picture area from the document image and outputting text data and position information of the text data as a result of the character recognition;
a recognition result converter for determining a structure of the text area and converting the position information of the text data such that the text data is disposed in a web document according to the structure of the text area; and
a web document creator for generating the web document by synthesizing the converted position information of the text data, the text data, the image file, and web document code.

2. The document editing apparatus of claim 1, wherein the character recognizer performs the character recognition after removing the selected picture area from the document image and filling the removed picture area with a surrounding background color.

3. The document editing apparatus of claim 1, wherein the position information of the text data is position information of each of lines, words, and characters of the text area.

4. The document editing apparatus of claim 1, wherein the web document creator edits a structured document in which the text data is disposed at corresponding positions with HyperText Markup Language (HTML) based on the converted position information of the text data.

5. The document editing apparatus of claim 1, wherein the web document creator determines, for each pair of consecutive lines in the text data, whether the lines in the in the pair of consecutive lines overlap each other, and if an overlapped pair of consecutive lines exists, the document creator performs character string adjustment on a line basis by moving a lower line of the overlapping pair of consecutive lines by a distance corresponding to an overlapping part of the lower line.

6. The document editing apparatus of claim 1, wherein, if the picture area is included in the document image, the image processor marks the picture area by using a marker and requests a user-selection on the marked picture area.

7. The document editing apparatus of claim 6, wherein the marked picture area is selected by according to a user-designated starting point and ending point, or selected by a user-drag for designating the picture area.

8. A document editing method comprising:
determining whether a picture area is included in a document image;
if a picture area is included in the document image, selecting the picture area;
capturing the selected picture area and storing the captured picture area as an image file;
performing character recognition of a text area remaining by removing the selected picture area from the document image;
outputting text data and position information of the text data as a result of the character recognition;
determining a structure of the text area and converting the position information of the text data such that the text data is disposed in a web document according to the structure of the text area; and
generating the web document by synthesizing the converted position information of the text data, the text data, the image file, and web document code.

9. The document editing method of claim 8, wherein the performing of the character recognition comprises performing the character recognition after removing the selected picture area from the document image and filling the removed picture area with a surrounding background color.

10. The document editing method of claim 8, wherein the position information of the text data is position information of each of lines, words, and characters of the text area.

11. The document editing method of claim 8, wherein editing the web document comprises editing a structured document in which the text data is disposed at corresponding positions with HyperText Markup Language (HTML) based on the converted position information of the text data.

12. The document editing method of claim 8, wherein editing of web document comprises;
determining, for each pair of consecutive lines in the text data, whether the two lines in the pair of consecutive lines overlap each other; and
if an overlapped pair of consecutive lines exists, performing character string adjustment on a line basis by moving a lower line of the overlapped pair of lines by a distance corresponding to an overlapping part of the lower line.

13. The document editing method of claim 8, wherein the selecting of the picture area comprises:
if the picture area is included in the document image, marking the picture area by using a marker; and
requesting a user-selection on the marked picture area.

14. The document editing method of claim 13, wherein the marked picture area is selected by according to a user-designated starting point and ending point, or selected by a user-drag for designating the picture area.

15. The document editing apparatus of claim 1, wherein the web document creator calculates an average of heights of multiple characters included in a single line character string of text data to determine a font size and adjusts heights of the multiple characters by using the calculated font size when the web document code is created.

16. The document editing method of claim 8, further comprising:
calculating an average of heights of multiple characters included in a single line character string of text data to determine a font size; and
adjusting heights of the multiple characters by using the calculated font size.

* * * * *